Aug. 3, 1965     S. VOLLPRECHT     3,198,996
ELECTROMAGNET ACTUATOR HAVING A SHOCK ABSORBING MEANS
Filed June 19, 1963
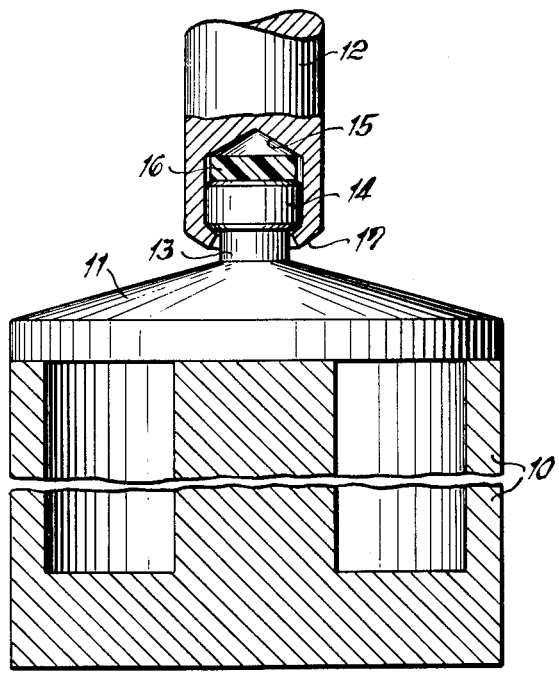
INVENTOR
Siegfried Vollprecht
by Michael S. Striker

United States Patent Office 3,198,996
Patented Aug. 3, 1965

3,198,996
ELECTROMAGNET ACTUATOR HAVING A
SHOCK ABSORBING MEANS
Siegfried Vollprecht, Wernau (Neckar), Germany,
assignor to Junkers & Co. G.m.b.H., Wernau
(Neckar), Germany
Filed June 19, 1963, Ser. No. 289,100
Claims priority, application Germany, June 20, 1962,
J 21,971
7 Claims. (Cl. 317—195)

The present invention relates to motion transmissions.

More particularly, the present invention relates to transmissions for transmitting motion in response to movement of an armature of an electromagnet.

It is a primary object of the present invention to provide a motion transmission of the above type which makes it possible to provide for an armature plate having magnetic operating characteristics far superior to those which are encountered in conventional structures of this type.

It is furthermore an object of the present invention to provide a structure where the connection between the armature plate and the rod extending between the latter and a gas valve or the like is much simpler and far superior to a conventional connection of this type.

It is moreover an object of the present invention to provide between an armature plate and a motion-transmitting element connected thereto, such as a rod, a structure which will dampen any shocks between the armature plate and the motion transmitting element such as are likely to be encountered during sudden starting or stopping of the movement of the armature plate. With conventional structures of the type referred to above the impact between the parts results not only in wear but also in creation of fine particles, resulting from the wear, which become undesirably situated in the air gap of the electromagnet. This latter disadvantage is also reliably avoided with the structure of the present invention.

With the above objects in view, the invention includes, in a motion transmission, an armature member forming part of an electromagnet and a motion-transmitting member located adjacent the armature member. One of these members is formed with a bore having an open end and an opposite closed end, and the other of these members is provided with a projection formed between a free end portion of the projection and the remainder of this other member with an annular groove, the free end portion of the projection being received in the bore and the member which is formed with the bore having an inwardly directed portion extending into the groove of the projection for connecting the members to each other. Within the bore there is located a resilient, yieldable means engaging the closed end of the bore as well as the free end portion of the projection to yieldably resist movement of the free end portion of the projection toward the closed end of the bore.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which one possible structure according to the present invention is shown partly in section.

In the drawing, for the sake of simplicity, there is illustrated part of a thermoelectric ignition-safety device, and the part of the structure illustrated in the drawing includes the body 10 of the electromagnet, the coil of which is not illustrated as well as the connection of the coil to the thermo-element, these features being of course well known in the art. Thus, it will be seen that the magnetic body 10 has the configuration of a cylinder provided in its interior with an axially extending core around which the coil of the magnet is wound. Such thermoelectric ignition-safety devices are disclosed, for example, by U.S. Patent 2,901,034. At the top end of the body 10 is located the armature member 11 of the electromagnet, this armature member 11 being in the form of a plate which is circular and has an axis coinciding with the axis of the cylindrical body 10, the plate 11 having an upper portion, as viewed in the drawing, which is of a substantially frustoconical configuration.

The structure of the invention interconnects the armature plate 11 with an elongated motion-transmitting member 12 in the form of an elongated rod, this rod 12 being connected to an unillustrated gas valve in a manner well known in the art.

As is apparent from the drawing the armature plate 11 is formed integrally with an elongated projection which extends along the axis of the armature and which is formed with an annular exterior groove 13 located between an enlarged free end portion 14 of the projection and the remainder of the armature 11.

The elongated motion-transmitting rod 12 is formed at its end portion which is adjacent to the armature plate 11 with an elongated bore which extends along the axis of the armature and which has an open end next to the armature and surrounding the groove 13 and an opposite closed end 15 which forms the part of the bore which is most distant from the armature plate 11. At the open end of its bore, the rod 12 is formed with an inwardly directed portion 17 which extends into the groove 13 for connecting the rod 12 and the armature 11 to each other for movement together. This inwardly directed portion 17 is simply formed by deforming the free end of the rod 12 at the open end of the bore thereof inwardly to provide the rod 12 with the inwardly directed annular free edge portion 17 which extends into the groove 13 in the manner indicated in the drawing.

Also in accordance with the present invention there is provided between the closed end 15 of the bore and the free end portion 14 of the projection a yieldable, resilient means 16 which engages the closed end 15 of the bore and the free end portion 14 of the projection to yieldably resist movement of the free end portion 14 toward the closed end 15 of the bore of the rod 12. This yieldable resilient means, in accordance with the present invention, takes the form of a block 16 of a material which has properties similar to that of soft rubber, and it is preferred that this block 16 be made of a synthetic plastic material, such as polyvinylchloride or butadiene polymers.

Because of the presence of the resilient yieldable means 16, it is possible for the assembly to automatically yield for compensating for any inaccuracies in the positioning of the elements between the electromaget and the valve which is controlled by the rod 12. Moreover, it will be seen that with this structure there is very little wear of the parts and furthermore the yieldable means 16 will act as a damping structure to absorb any shocks resulting from sudden stopping or starting of the movement of the armature plate 11. Thus, when the electromagnet is energized the sudden pull on the armature plate 11 will not result in a severe impact with the rod 12, and of course the life of the assembly is very greatly increased.

It is particularly to be noted that the armature plate 11 is not formed with any openings so that the magnetic operating characteristics thereof are far superior to those which would obtain if the plate 11 were formed with an opening. Thus, it is of course conceivable that the invention will be applied to a structure where it is the armature 11 which is formed with the bore which receives the enlarged end portion of a projection at the end of the rod 12 with a free edge portion of the armature at the open end of the bore curved inwardly to provide an inwardly directed portion similar to the portion 17 located in a groove of a projection of the rod 12 to fasten the latter to the armature and of course with the yieldable, elastic means 16 of the present invention located in the armature bore engaging the closed end thereof and the free end portion of the projection of the rod 12 which is received in the bore. However, the structure shown in the drawing and described above is preferred to this latter alternative structure since the magnetic characteristics of the structure shown in the drawing and described above are superior because the provision of the inwardly directed edge portion, similar to edge portion 17, on a part of the armature which is made of a relatively sensitive work material will undesirably influence the flow of the magnetic flux.

An armature plate 11 which is not formed with any openings, as described above and shown in the drawing, is particularly suitable with a magnet body 10 of the type referred to above and shown in the drawing, since in this way a much more favorable flow of magnetic flux is obtained, and with a thermoelectric ignition-safety device a much shorter opening time can be obtained with this structure than when another type of magnet such as a horseshoe magnet is used. Furthermore, because the elastic connection provides a certain yieldable play it is possible for the armature plate to rest solidly and fully against the body 10, while at the same time the creation of any particles of material resulting from wear of the parts is reliably avoided so that such particles cannot become located in the air gap.

It will be understood that each of the elements described above, or two or more together, may also find a useful application in other types of motion transmissions differing from the types described above.

While the invention has been illustrated and described as embodied in electromagnetic motion transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electromagnetic actuator, in combination, an electromagnet having an exposed face; an armature member having a face corresponding and arranged adjacent to said exposed face of said electromagnet and movable towards and away from the same; and a rod-shaped motion-transmitting member located adjacent said armature member, one of said members being formed with a bore having an open end and an opposite closed end and the other of said members having an elongated projection formed extending therefrom and including a free end portion, said elongated projection being formed with an annular groove between the remainder of said other member and said free end portion, said free end portion of said projection being received in said bore and said one member having an annular projection extending into said groove for connecting said members to each other; and yieldable means located in said bore, engaging said closed end thereof and said free end portion of said projection for yieldably resisting movement of said projection toward said closed end of said bore.

2. In an electromagnet actuator, in combination, an electromagnet having an exposed face; an armature member having a predetermined axis and having a side including a face corresponding and arranged adjacent to said exposed face of said electromagnet and movable towards and away from the same along said axis, and an elongated rod member extending along said axis and located adjacent said armature member, one of said members being formed with a bore which extends along said axis and which has an open end and an opposite closed end, and the other of said members having an elongated projection extending therefrom and including a free end portion, said projection being formed with an annular groove between said free end portion and the remainder of said other member, said projection also extending along said axis and said free end portion of said projection being received in said bore of said one member, said one member having a projection extending into said groove for connecting said rod member and armature member to each other; and yieldable means in said bore engaging said closed end thereof and said free end portion of said projection for yieldably resisting movement of said free end portion of said projection toward said closed end of said bore.

3. In an electromagnetic actuator, in combination, an electromagnet having an exposed face; a substantially plate-like armature member having a predetermined axis and having a side including a face corresponding and arranged adjacent to said exposed face of said electromagnet and movable towards and away from the same along said axis and an elongated rod member extending along said axis and located adjacent the other side of said armature member, one of said members being formed with a bore which extends along said axis and which has and open end and an opposite closed end, and the other of said members having an elongated projection extending therefrom and including a free end portion, said projection being formed with an annular groove between said free end portion and the remainder of said other member, said projection also extending along said axis and said free end portion of said projection being received in said bore of said one member, said one member having a projection extending into said groove for connecting said rod member and armature member to each other; and yieldable means in said bore engaging said closed end thereof and said free end portion of said projection for yieldably resisting movement of said free end portion of said projection toward said closed end of said bore, said projection of said one member which extends into said groove being in the form of an inwardly directed free edge portion of said one member located at said open end of said bore and received in said groove.

4. In an electromagnetic actuator, in combination, an electromagnet having an exposed face; a substantially plate-like armature having a predetermined axis and having a side including a face corresponding and arranged adjacent to said exposed face of said electromagnet and movable towards and away from the same along said axis, said armature having a projection extending from the other side thereof along said axis and formed with an annular groove between a free end portion of said projection and said other side of said armature; an elongated rod extending along said axis and having an elongated portion adjacent said armature and formed along said axis with a bore which receives said free end portion of said projection, said bore having a closed end toward which said free end portion of said projection is directed and an open end surrounding said groove, and said rod having at said open end thereof an inwardly directed projection extending into said groove for connecting said armature and rod to each other; and yieldable, resilient means located in said bore and engaging said closed end thereof and said free end portion of said projection for yieldably resisting movement of the latter toward said closed end of said bore.

5. In an electromagnetic actuator, in combination, an electromagnet having an exposed face; a substantially plate-like armature having a predetermined axis and having a side including a face corresponding and arranged adjacent to said exposed face of said electromagnet and movable towards and away from the same along said axis, said armature having a projection extending from the other side thereof along said axis and formed with an annular groove between a free end portion of said projection and said other side of said armature; an elongated rod extending along said axis and having an elongated portion adjacent said armature and formed along said axis with a bore which receives said free end portion of said projection, said bore having a closed end toward which said free end portion of said projection is directed and an open end surrounding said groove, and said rod having at said open end thereof an inwardly directed projection extending into said groove for connecting said armature and rod to each other; and yieldable, resilient means located in said bore and engaging said closed end thereof and said free end portion of said projection for yieldably resisting movement of the latter toward said closed end of said bore, said yieldable, resilient means being in the form of a block of material having the properties of soft rubber.

6. In an electromagnetic actuator, in combination, a substantially cylindrical electromagnet having a substantially circular flat exposed face; a substantially flat plate-like armature having a predetermined axis and having a side including a face corresponding and arranged adjacent to said exposed face of said electromagnet and movable towards and away from the same along said axis, said armature having a projection extending from the other side thereof along said axis and formed with an annular groove between a free end portion of said projection and said other side of said armature; an elongated rod extending along said axis and having an elongated portion adjacent said armature and formed along said axis with a bore which receives said free end portion of said projection, said bore having a closed end toward which said free end portion of said projection is directed and an open end surrounding said groove, and said rod having at said open end thereof an inwardly directed projection extending into said groove for connecting said armature and rod to each other; and yieldable, resilient means located in said bore and engaging said closed end thereof and said free end portion of said projection for yieldably resisting movement of the latter toward said closed end of said bore, said yieldable resilient means being in the form of a synthetic plastic block of material having the properties of soft rubber.

7. In an electromagnetic actuator, in combination, an electromagnet having an exposed face; an armature plate having a predetermined axis and including a face having a continuous surface corresponding with and arranged adjacent to said exposed face of said electromagnet and movable towards and away from the same along said axis, said plate being integral with an elongated projection extending along said axis of said plate from the other face thereof and formed with a groove extending around said axis at the exterior of said projection between a free end portion of said projection and said plate; an elongated rod extending along said axis and formed with a bore also extending along said axis and having an open end directed toward said plate, said bore having a closed end distant from said plate and said free end portion of said projection being received in said bore with said open end of said bore surrounding said groove, said rod being formed at said open end of said bore with an inwardly directed annular portion extending into said groove substantially to the innermost portion thereof for connecting said rod to said plate; and a block of yieldable resilient material having substantially the properties of soft rubber and located in said bore in engagement with the closed end thereof and with said free end portion of said projection for yieldably resisting movement of said free end portion of said projection toward the closed end of said bore.

References Cited by the Examiner

UNITED STATES PATENTS

| | | | |
|---|---|---|---|
| 1,389,056 | 8/21 | Lane | 251—129 |
| 2,735,047 | 2/56 | Garner et al. | 317—195 |
| 3,034,761 | 6/62 | Janquart | 251—129 |

BERNARD A. GILHEANY, *Primary Examiner.*

JOHN F. BURNS, *Examiner.*